(12) United States Patent
Broman et al.

(10) Patent No.: US 6,751,778 B1
(45) Date of Patent: Jun. 15, 2004

(54) INFORMATION SERVER SYSTEMS AND METHODS OF RENDERING INFORMATION PAGES

(75) Inventors: David M Broman, Redmond, WA (US); Ariye M Cohen, Seattle, WA (US); Rico Mariani, Kirkland, WA (US); Attila Narin, Kirkland, WA (US); Sanjeev K Rajan, Kirkland, WA (US); Lin-Fon Shaw, Clyde Hill, WA (US); Bassam Tabbara, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/304,134

(22) Filed: May 3, 1999

Related U.S. Application Data

(63) Continuation-in-part of application No. 08/669,781, filed on Jun. 26, 1996.

(51) Int. Cl.[7] .............................................. G06F 17/21
(52) U.S. Cl. ...................... 715/517; 715/523; 715/530
(58) Field of Search .............................. 715/501.1, 513, 715/517, 522, 523, 530, 531

(56) References Cited

U.S. PATENT DOCUMENTS

| | | | |
|---|---|---|---|
| 5,644,776 A | | 7/1997 | DeRose et al. |
| 5,680,152 A | | 10/1997 | Bricklin |
| 5,740,430 A | * | 4/1998 | Rosenberg et al. ......... 395/616 |
| 5,760,772 A | | 6/1998 | Austin |
| 5,764,235 A | | 6/1998 | Hunt et al. |
| 5,793,972 A | | 8/1998 | Shane |
| 5,812,847 A | | 9/1998 | Joshi et al. |
| 5,844,559 A | | 12/1998 | Guha |
| 5,860,073 A | * | 1/1999 | Ferrel et al. ................ 707/522 |
| 5,894,554 A | | 4/1999 | Lowery et al. |
| 6,006,242 A | | 12/1999 | Poole et al. |
| 6,014,638 A | | 1/2000 | Burge et al. |

OTHER PUBLICATIONS

Netscape 2 Unleashed, sams.net Publishing, 2/96, pp. 408–413 and 422–437, Oliver et al.

* cited by examiner

*Primary Examiner*—Stephen S. Hong
(74) *Attorney, Agent, or Firm*—Lee & Hayes PLLC

(57) ABSTRACT

Methods and systems for rendering information pages are described. A page is divided into panes which are rendered by individual pane renderers. The pane renderers can be shared between pages, or even re-used across multiple applications. Rendering support components or objects are provided and can provide access to shared services or data (e.g. ads, user preferences, scripts, and styles) that might be required by multiple panes on a page. Page descriptions comprising pane renderers are created dynamically in a prescribed fashion by an application. A page renderer service in a platform then processes the page description and causes the appropriate RSOs to be called, initialized, and used by the pane renderers to render the page.

54 Claims, 7 Drawing Sheets

INFORMATION SERVER SYSTEMS AND METHODS OF RENDERING INFORMATION PAGES

RELATED APPLICATION

This is a continuation-in-part of, and claims priority from U.S. patent application Ser. No. 08/669,781, filed on Jun. 26, 1996, the disclosure of which is incorporated by reference.

TECHNICAL FIELD

This invention relates to information server systems and to methods of rendering information pages.

BACKGROUND

"Hypermedia" is a metaphor for presenting information in which text, images, sounds, and actions become linked together in a complex, non-sequential web of associations that permit a user to browse through related topics, regardless of the presented order of the topics. "Hypermedia" arises from the term "hypertext," which was originally coined to describe linking in textual documents.

Hypermedia content is widely used for navigation and information dissemination on the "World-Wide Web" (WWW or Web) of the Internet. An application program referred to as a client viewer or "Web browser" is normally used to retrieve and render hypermedia content from the WWW.

Hypermedia content is commonly organized as documents or files with embedded control information. The embedded control information includes formatting specifications that indicate how a document is to be rendered by the Web browser. In addition, such control information can include links or "hyperlinks": symbols or instructions telling the Web browser where to find other related WWW documents on the Internet. A hyperlink from one hypermedia topic to another is normally established by the author of a hypermedia document, although some applications allow users to insert hyperlinks to desired topics.

When a user selects or activates a hyperlink from a browser, the browser requests the document or file that is targeted by the hyperlink. In response, the file is downloaded to the browser, and the browser displays or otherwise renders the hypermedia content specified by the file.

The different functionality of available browsers presents a dilemma for authors of Web content. To assure compatibility across a wide range of browsers, authors can simply limit their use of features to a core set that is available on all or nearly all browsers. Much more impressive presentations can of course be achieved by utilizing more advanced features; at the unfortunate cost, however, of limiting available audiences to those having browsers with the advanced features.

In some cases, it is possible to format a Web document for a particular browser, and the document will still be viewable with other browsers. However, the other browsers will not be able to display the document with all of its formatting, and the document will not look as good on these browsers.

A similar problem is presented by the distribution of Web content to users or clients having vastly different equipment characteristics or capabilities. Communications speed is one characteristic that varies widely between Internet users. Many users are limited to relatively slow speeds such as 9,600 bits-per-second. At this speed, transferring bit-mapped graphic images is painfully slow. Other users might have a connection to an Internet provider at 28,800 bits-per-second, making bit-mapped image transfer much more acceptable. Still other users might have connections at ISDN or higher speeds, allowing the exchange of data at much higher resolutions.

Displays also vary dramatically from client to client. It is becoming more and more common for desk-based computers to have 21-inch, high-resolution, color displays. At the same time, the use of laptop computers is becoming very common. Laptop computers typically have more limited display capabilities. Other devices might have even more limited capabilities. Electronic pocket organizers, for instance, might have only a very small monochrome display, at a very low pixel resolution.

It is difficult, and in many cases impossible, for an author to create a Web document that is well suited for all of the different clients that might eventually make use of the document. Presently, the only way to achieve this goal is to create multiple hypertext documents, or possibly to vary document contents by using embedded scripts. For clients having small displays and low communication speeds, the author might wish to limit the amount of graphic images provided, or in some cases to provide images in monochrome rather than color format. For clients having large displays, communicating at ISDN speeds, it will be more desirable to provide extensive color, high-resolution graphics. The author might also wish to create different Web documents for clients using different browsers. One can imagine many other variations that an author might wish to make in Web documents based on different characteristics of intended clients or users.

This invention arose out of concerns associated with providing improved methods and systems for rendering information pages.

SUMMARY

This invention concerns methods and systems for rendering information pages, such as Web pages delivered over the Internet. Pages are created dynamically. An individual page is divided into multiple panes. The panes are then rendered by individual pane renderers that can be shared between pages, or even re-used across multiple applications. Rendering support components or objects provide access to shared services or data (e.g. ads, user preferences) that might be required by multiple panes on a page. A platform processes the page by invoking the appropriate page renderers and causing the rendering support components to be called, initialized, and used by the pane renderers.

BRIEF DESCRIPTION OF THE DRAWINGS

The same reference numbers are used throughout the disclosure to reference like components and features.

DETAILED DESCRIPTION

Network Configuration

As a preliminary matter, the following disclosure assumes a familiarity with Internet and WWW practices, formats, and protocols. A great number of books are available on these subjects. Stout, Rick, *The World Wide Web: Complete Reference*, McGraw-Hill, 1996, is one example.

Figure 1:
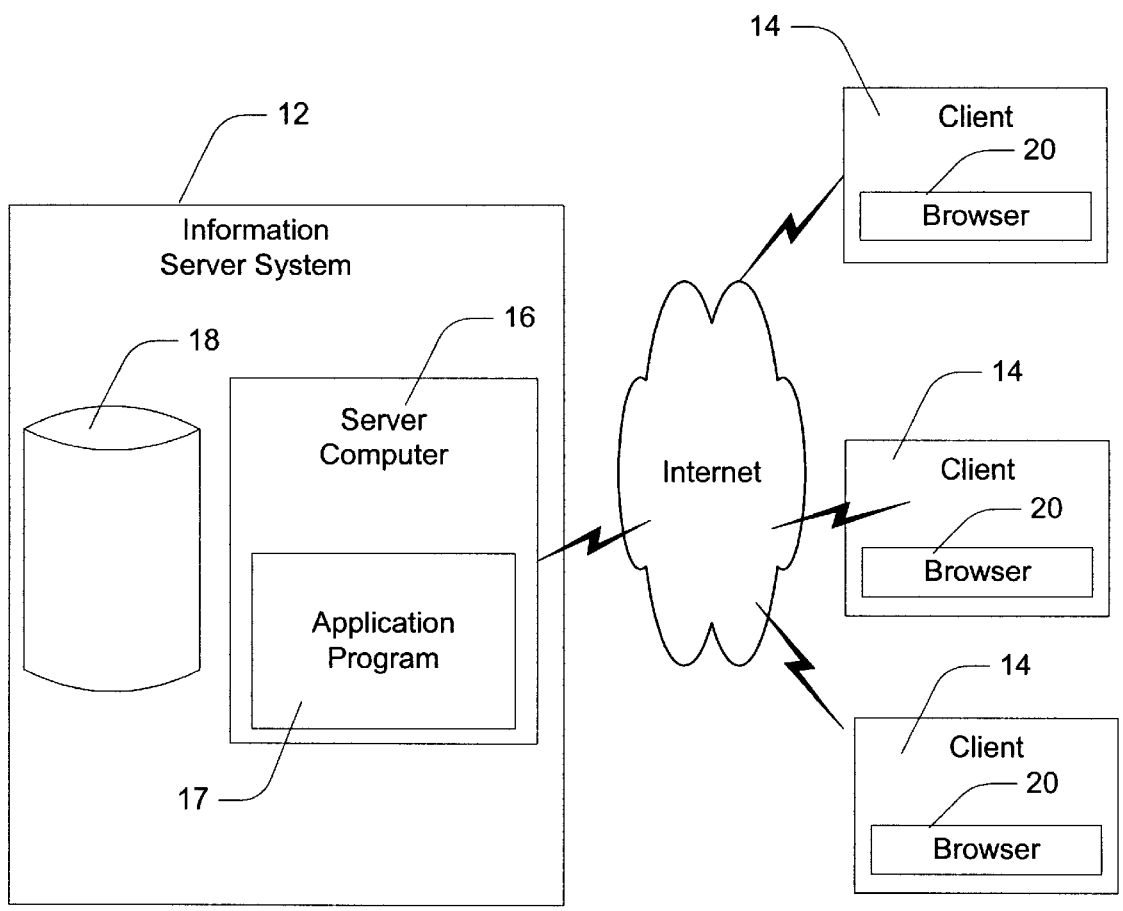
FIG. 1 is a block diagram of a client/server network system having a client and server.

FIG. 1 shows an information server system 12 in accordance with the invention, connected for data communications with associated clients or client devices 14. The information server system comprises a server 16 and a repository 18 of published data and other content. Server 16 is a computer that executes one or more server programs 17. Server 16 has access to repository 18, which is typically a hard disk or other mass storage device. Mass storage device 18 can be located either locally or remotely, and can be connected through a local bus, a local-area network, or a wide-area network such as the Internet. Server 16 includes a data processor, electronic memory, and other components common to computers that are used for server applications.

Each of client devices 14 is any device such as a personal computer that might be connected to receive information from server system 12. Client device 14 has a client viewer 20 that forms an interface to a human user or operator. Client viewer 20 interprets instruction and data streams provided by system 12 and in response presents information to the user in textual, graphical, or other forms. Client viewer 20 also accepts operator input, and allows the operator to select and navigate from one hypermedia document to another using hyperlinks as described above. Client viewer 20 is connected for data communications with server system 12 by a suitable communications medium such as a local or wide area network, by a modem link, or by a similar continuous or on-demand connection. The preferred data connection between server system 12 and client devices 14 is through the Internet, using HTTP (hypertext transport protocol).

In the preferred embodiment, client viewer 20 is a conventional, off-the-shelf Internet Web browser, having features and functions such as are common to popular Web browsers. Client viewer 20 is not limited to any particular type of Web browser. For instance, client viewer 20 might be the Internet Explorer, available from Microsoft Corporation of Redmond, Washington, or a Netscape Navigator browser, available from Netscape of Mountain View, Calif. Each of these browsers supports a different feature set, and responds to different commands and command sets. In addition, the term "client viewer" as used herein encompasses any software that is used by a client to interpret data obtained from server system 12. In the future, such software will likely comprise a variety of downloadable components and helper applications used by software other than traditional browsers to render multimedia content from the Internet or other servers.

Exemplary Computer Architecture

Figure 2:
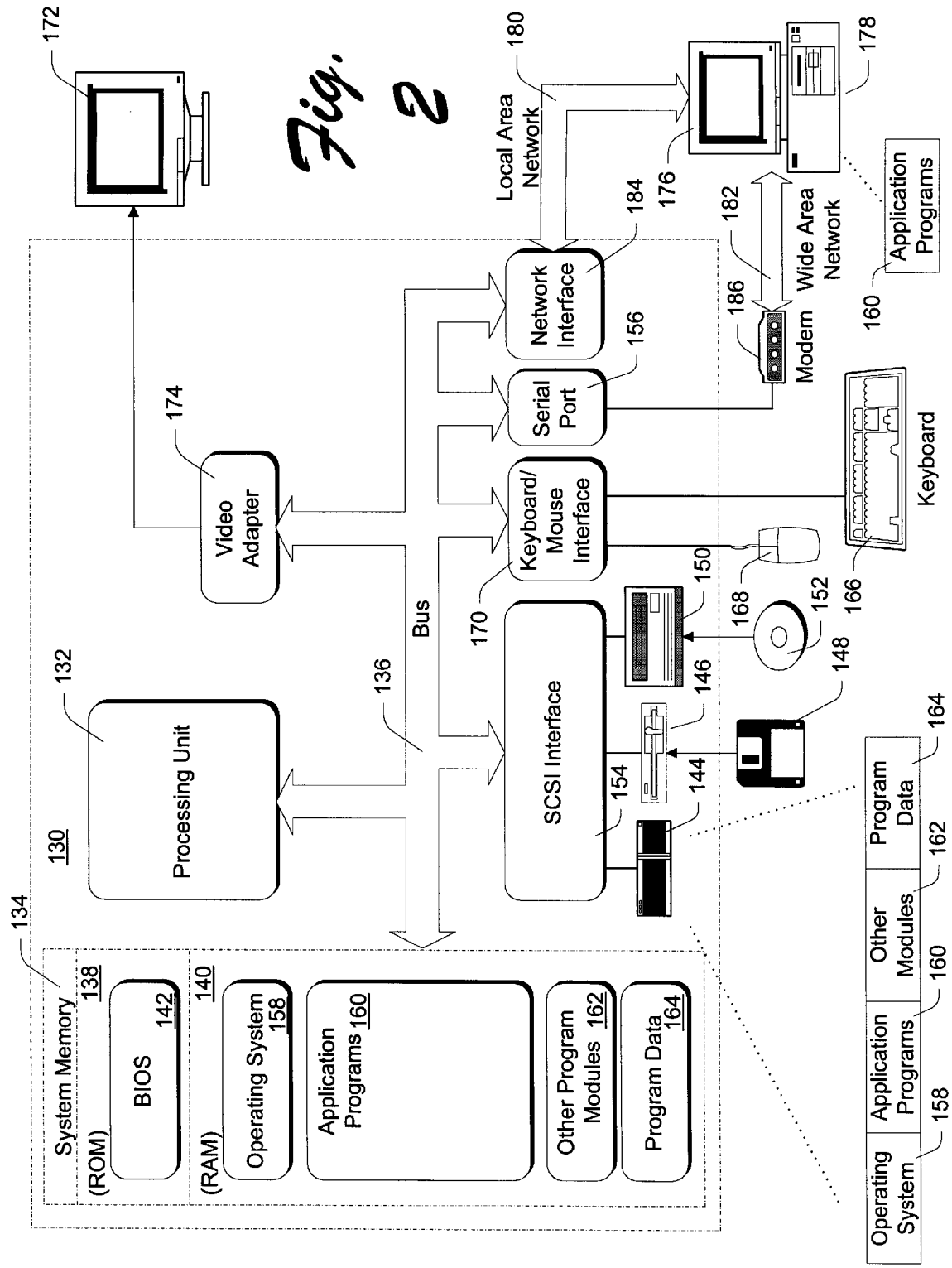
FIG. 2 is a block diagram of an exemplary computer that can be used to implement the client and/or the server of FIG. 1.

FIG. 2 shows a general example of a desktop computer 130 that can be used to implement the client 14 and/or the server 12.

Computer 130 includes one or more processors or processing units 132, a system memory 134, and a bus 136 that couples various system components including the system memory 134 to processors 132. The bus 136 represents one or more of any of several types of bus structures, including a memory bus or memory controller, a peripheral bus, an accelerated graphics port, and a processor or local bus using any of a variety of bus architectures. The system memory 134 includes read only memory (ROM) 138 and random access memory (RAM) 140. A basic input/output system (BIOS) 142, containing the basic routines that help to transfer information between elements within computer 130, such as during start-up, is stored in ROM 138.

Computer 130 further includes a hard disk drive 144 for reading from and writing to a hard disk (not shown), a magnetic disk drive 146 for reading from and writing to a removable magnetic disk 148, and an optical disk drive 150 for reading from or writing to a removable optical disk 152 such as a CD ROM or other optical media. The hard disk drive 144, magnetic disk drive 146, and optical disk drive 150 are connected to the bus 136 by an SCSI interface 154 or some other appropriate interface. The drives and their associated computer-readable media provide nonvolatile storage of computer-readable instructions, data structures, program modules and other data for computer 130. Although the exemplary environment described herein employs a hard disk, a removable magnetic disk 148 and a removable optical disk 152, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment, A number of program modules may be stored on the hard disk 144, magnetic disk 148, optical disk 152, ROM 138, or RAM 140, including an operating system 158 (e.g., the server operating system 22 below), one or more application programs 160 (e.g., application(s) 30, Internet Information Server 24 below), other program modules 162 (e.g., platform 26 below), and program data 164. A user may enter commands and information into computer 130 through input devices such as a keyboard 166 and a pointing device 168. Other input devices (not shown) may include a microphone, joystick, game pad, satellite dish, scanner, or the like. These and other input devices are connected to the processing unit 132 through an interface 170 that is coupled to the bus 136. A monitor 172 or other type of display device is also connected to the bus 136 via an interface, such as a video adapter 174. In addition to the monitor, personal computers typically include other peripheral output devices (not shown) such as speakers and printers.

Computer 130 commonly operates in a networked environment using logical connections to one or more remote computers, such as a remote computer 176. The remote computer 176 may be another personal computer, a server, a router, a network PC, a peer device or other common network node, and typically includes many or all of the elements described above relative to computer 130, although only a memory storage device 178 has been illustrated in FIG. 2. The logical connections depicted in FIG. 2 include a local area network (LAN) 180 and a wide area network (WAN) 182. Such networking environments are commonplace in offices, enterprise-wide computer networks, intranets, and the Internet.

When used in a LAN networking environment, computer 130 is connected to the local network 180 through a network interface or adapter 184. When used in a WAN networking environment, computer 130 typically includes a modem 186 or other means for establishing communications over the wide area network 182, such as the Internet. The modem 186, which may be internal or external, is connected to the bus 136 via a serial port interface 156. In a networked environment, program modules depicted relative to the personal computer 130, or portions thereof, may be stored in the remote memory storage device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

Server Object Architecture

Figure 3:
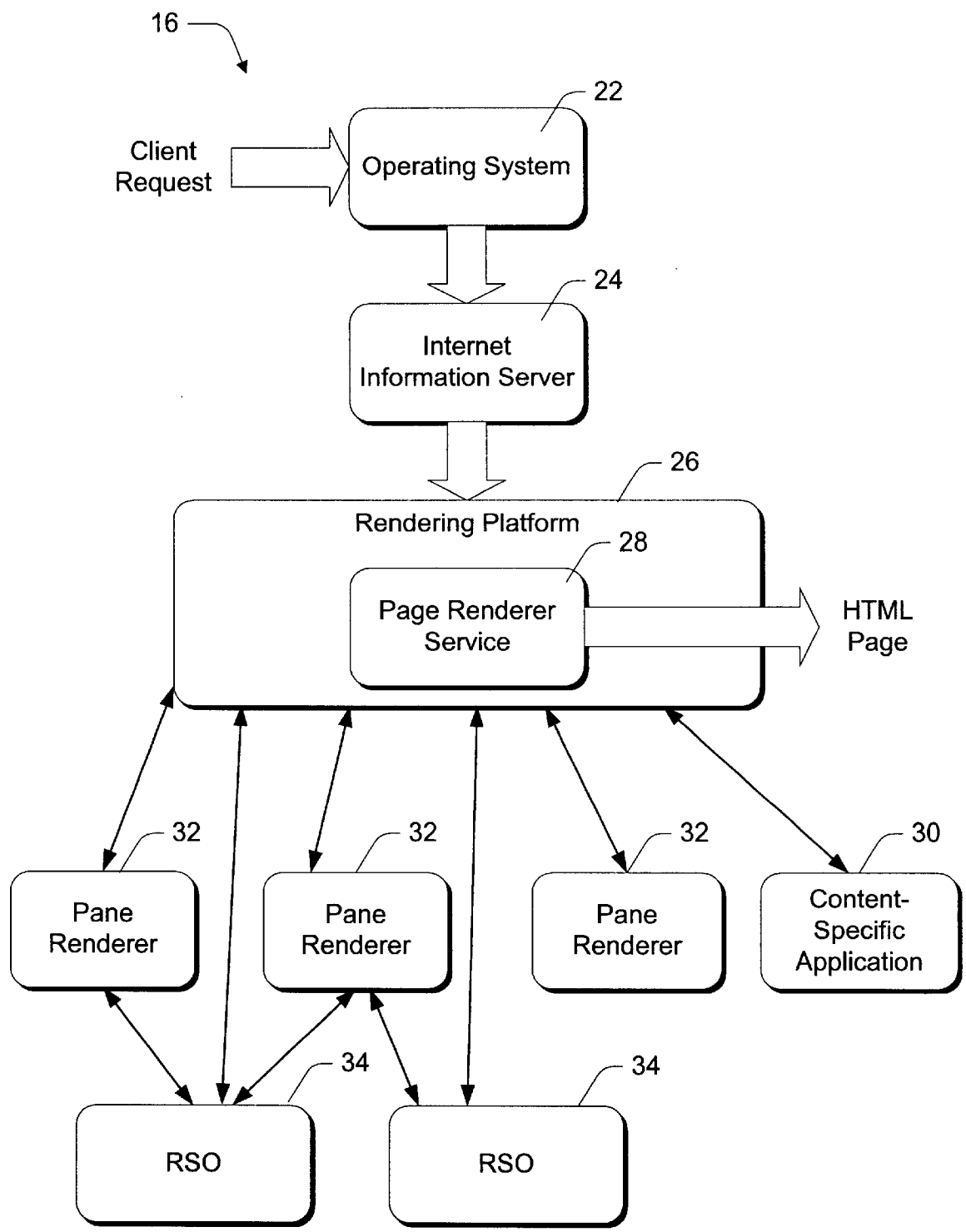
FIG. 3 is a block diagram showing a portion of the server software architecture implemented by the server of FIG. 1.

FIG. 3 shows the general architecture used by server 16 to generate HTML information pages in response to requests from client computers 14. Generally, server 16 is called upon to generate HTML pages dynamically, rather than to retrieve static HTML pages. The various components of FIG. 3 make up the server programs referenced in FIG. 1.

The server has an operating system 22, which in turn has a network component (not shown) that receives requests from clients 14. The request is forwarded to an Internet processing component 24 such as the Internet Information Server produced by Microsoft Corporation. A rendering platform 26 is registered as an ISAPI extension to processing component 24. Accordingly, the request is passed on to rendering platform 26, which is responsible for generating a response to the request. Application 30 can also generate a response.

Rendering platform 26 is a generic component that coordinates interaction between various content-specific components or objects. It includes a page renderer service 28 generating an HTML-formatted information page in conjunction with the content-specific components.

The content-specific components include a content-specific application 30, a plurality of pane renderers 32, and a plurality of rendering support components or objects (RSOs) 34. In the described embodiment, all of these objects are implemented as COM objects, which form part of the Object Linking and Embedding (OLE) model that is common in Windows programming. COM objects and interfaces are described in Brockschmidt, Kraig, *Inside OLE*, Second Edition, Microsoft Press, 1995. Use of COM is in no way necessary to practice the inventive concepts disclosed herein. Rather, any suitable object creation and management methodology would suffice.

Content-specific application 30 is responsible for specifying components of a requested information page. It specifies these components in terms of pane objects and their relative layout.

Pane objects or renderers 32 are called to emit specific information panes in the form of HTML codes.

RSOs 34 are generally used to retrieve data for different panes. A single RSO can be called by a number of different pane renderers. This provides a way for pane renderers to share code, so that the same functionality does not have to be implemented numerous times in different pane renderers. Generally, the pane renders 32 are concerned with layout and formatting, while the RSOs are concerned with data retrieval and other more substantive tasks. RSOs can also be used to provide shared rendering services that can be used by a variety of pane renderers that then build upon those services. These services can include, among others, generation of HTML fragments, styles, scripts, and the like.

When a client request is received, the rendering platform 26 calls the application 30 in order to receive a page layout description for the request. The application 30 then returns the page layout description to the platform 26. Responsive to receiving the page layout description, the page rendering service 28 of the platform 26 initializes each of the pane renderers 32 that will be required for rendering the information page. During initialization, the pane renderers 32 are given access to the RSOs 34 that will assist the pane renders with their pane rendering functions. After initialization of the pane renderers 32, the rendering platform 26 notifies the RSOs 34 and the application 30 that initialization has taken place. After the notifications, the pane renderers 32 can then render their respective panes. After the pane renders have rendered their respective panes, the rendering platform 26 again notifies the RSOs 34 and application 30 that page rendering is complete. After these notifications, the data, or information page, is provided to the client. Following this, the rendering platform 26 tells the application 30 that the page has been rendered and sent. This enables the application 30 to free up memory that was allocated for the page layout. A more detailed example of this entire process is described below.

Thread Management

Figure 4:
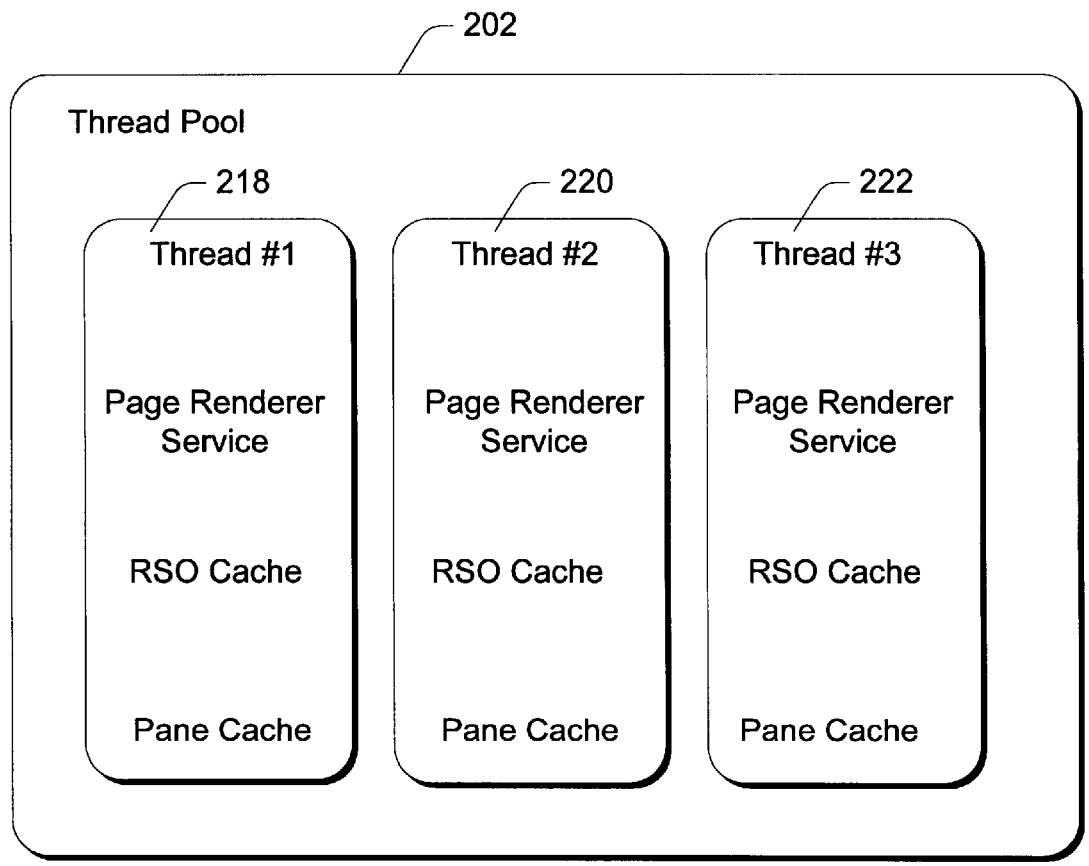
FIG. 4 is a block diagram of a thread pool component resident in the server software architecture of FIG. 3.

Part of the processing that rendering platform 26 undertakes is to create a thread pool for handling individual client requests. An exemplary thread pool is shown in FIG. 4 at 202. The thread pool 202 can include any suitable number of individual threads, with three exemplary threads 218, 220, and 222 being shown. Each thread is capable of handling an individual client request and has its own objects and services that are initialized and used by the thread for carrying out a request. For example, the illustrated threads have a page rendering service, and caches for the RSOs 34 and the pane renderers 32. When a request is received, a thread is selected to handle the request and subsequent processing can take place to render the information page as described above and below.

Server Software Architecture

Figure 5:
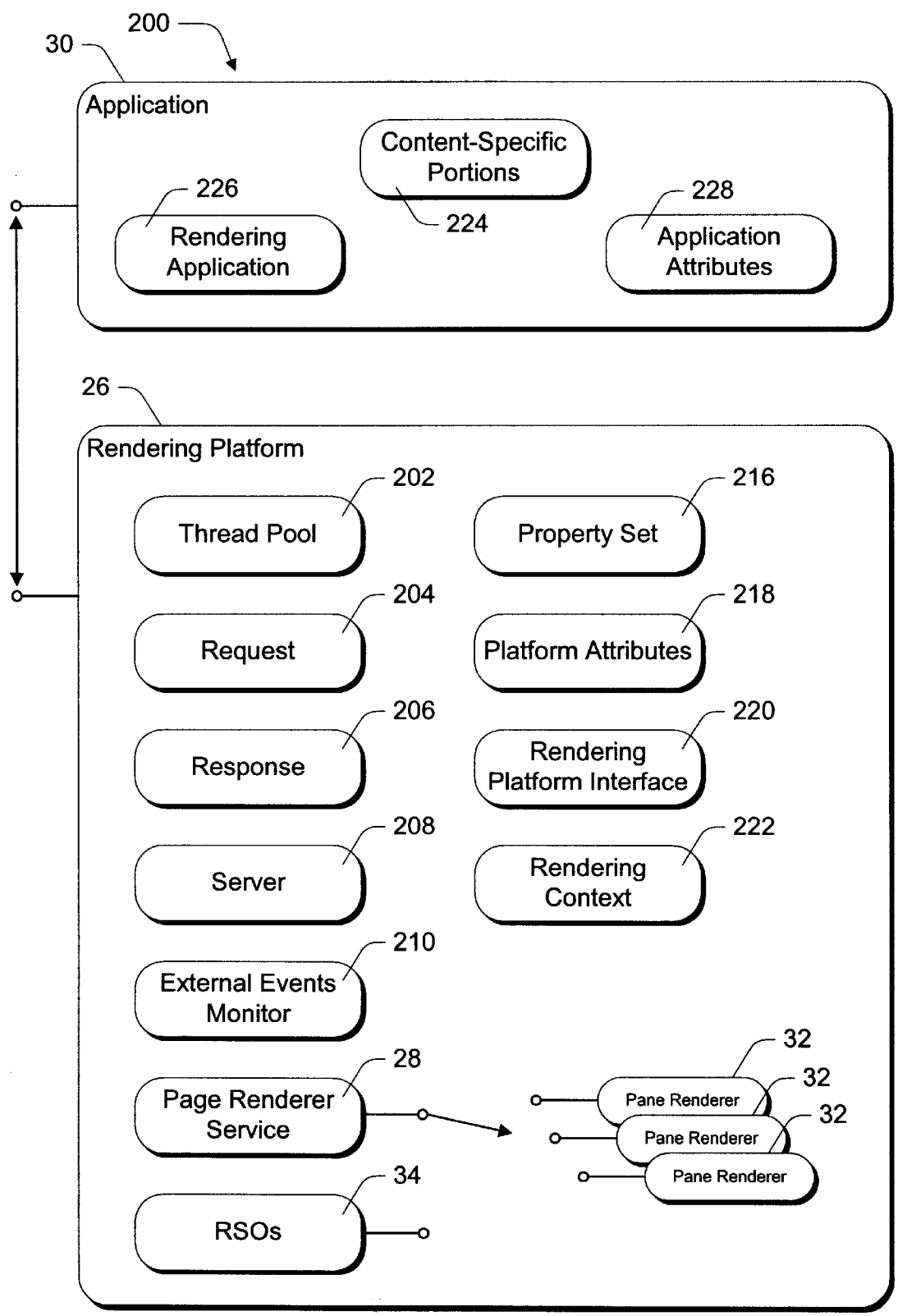
FIG. 5 is a block diagram that shows portions of a platform and an application that is implemented by the server of FIG. 1.

FIG. 5 shows a specific exemplary software architecture 200 implemented at server 12 that includes the platform 26 and an application 30. In the described embodiment, platform 26 includes a thread pool 202, a request 204, a response 206, a server 208, an external events monitor 210, a page renderer service 28 that is responsible for iterating over a plurality of pane renderers 32, and one or more rendering support components or objects 34. The platform also includes a property set 216, a platform attributes 218, a rendering platform 220, and a rendering context 222, all of which are discussed below in detail. Although page renderer service 28 is shown as being incorporated into platform 26, it is possible for the page renderer service to be implemented into application 30.

Application 30 embodies any content-specific portions 224 of a web-site, a rendering application 226, and an applications attributes 228, all of which are discussed below in detail. In the described embodiment, implementation takes place through the use of object-oriented programming techniques that draw upon fundamentals of Object Linking and Embedding (OLE) programming techniques. These techniques make use of COM objects and interfaces that are described in more detail in Brockschmidt, Kraig, *Inside OLE*, Second Edition, Microsoft Press, 1995. This is not, however, intended to limit the inventive concepts to implementation only through OLE techniques. Accordingly, other programming techniques and languages can be used. Use of OLE techniques do, however, carry with them features of extensibility, sharability, and genericness as will be appreciated by those of skill in the art.

Platform Objects and Interfaces

The platform objects and interfaces are used to manipulate a buffer that will be returned to the Internet Information Server 24 (FIG. 3). The descriptions given below constitute but one way of implementing the services and are not intended to be limiting in any way.

Request 204 is an object used by the pane renderers 32 to access information that is sent by a client's browser for a particular request. This can include properties sent on the URL, access to the cookies, and the like. Further, access can be provided to properties that are added by the application currently carrying out a particular thread's request, as well as those properties that are added by the platform. Examples of such properties might include a user's favorite cinemas or an identifier for the current application.

Response 206 is an object and used by the pane renderers 32 to provide access to methods which output and buffer HTML text of the HTTP response that will be sent to the client's browser. This object includes a "redirect" method that stops processing of the pane and forces the server to redirect the browser to another URL. For simplicity of discussion we will refer to the application and platform components generically writing to the Response, but in fact the Response object will generally keep a plurality of output buffers which are concatenated to create the final output. For example, when generating HTML, it is useful to have a buffer for the HTTP Header, one for the HTML head, and one for the HTML body. Other page description languages might require more or less buffers.

Server 208 is an object used by the pane renderers 32 to provide various server-centric services such as the ability to create and use new server-side components, access paths on the server, and other server defaults. The server object includes a method to "create objects" that creates an instance of any OLE Automation object. To aid in performance, this object may actually already have been created by platform 26 on startup, in which case that instance of the object will be passed to the caller—this includes any application-provided rendering support components or objects that the platform discovered. Whether the object was already created or is created in response to this function, the server object will attempt initialize the object with the current context before returning it.

External Events Monitor 210 allows for remote communication from external sources in addition to the client. For example, in addition to the platform receiving communication from a client's browser, e.g. through request 204, platform 26 can receive other information or messages such as a notification to switch to a new edition of a web page. The platform sets aside a thread that listens for external events. These events manifest themselves as socket communication that occurs on a dedicated socket port. On startup, the platform initiates a socket listen procedure that awaits new socket connections on the dedicated socket port. A socket thread is then spawned and sits in a loop waiting for a new connection. When there is a new connection, the socket thread then accepts the new connection. During normal execution of the rendering services, when the socket thread accepts a new connection, it handles communication with that socket client directly. At this point, all other socket clients trying to establish a connection are blocked. The socket thread then receives the socket command. The end of the socket command is signified by the client's doing a shutdown on the socket. If the command is not a recognizable notification, the platform closes the socket, and returns to the top of its socket acceptance loop. Otherwise, if it is a recognizable notification command, the command is executed, a response is sent to the client, the socket is closed, and the thread returns to the top of its socket acceptance loop.

Page renderer service 28 is a service for rendering a page. It can also be a component or object that is responsible for generating a resource or information page. The page renderer service is provided by the platform. A page renderer service generates an information page by operating upon a page layout that, in turn, causes it to iterate over a set of pane renderers 32 and assemble an information page in response to a request from Internet Information Server 24. A "pane renderer" is a component or object that is responsible for generating a section of an information page that will be displayed on the information page. A "pane" is rendered by a pane renderer and is an individual portion, area, or sub-division of an information page. An information page is made up of one or more panes, and all page information is presented within one of such panes. Panes can be tiled or otherwise arranged in mutually exclusive areas of a display screen. Panes might, however, be allowed to overlap each other, as may be appropriate and allowed for by the page description language in use (e.g., HTML, and the like).

Rendering support components or objects (RSOs) 34 are also provided for sharing various functions and information as will become apparent below. The RSOs provide a way for pane renderers to share code. RSOs can provide common data or services that might be needed by more than one pane renderer to the respective pane renderers that need the common data or services. The RSOs are in selective communication with the pane renderers. Examples of common data include end user information such as user name, address, user settings, and the like. Examples of common services include functions that, for instance, generate the name, address, and phone number of a business in a standard format.

A "property set" object 216 is provided and used by the pane renderers 32. This object acts as a general property bag that supports properties identified by the applications. This object can also support multi-valued properties. This object includes a "Get" method to get the value of a property from its ID. The ID is application-specific and is registered with the platform by the application. The value of the property can be either an array of values or a single-value property. The object also contains methods to set the value of a property ("Set") and to add a value to a multiple-value property ("AddValue").

A "platform attributes" interface 218 is provided and provides a callback to be used by the application for all objects that are interested in receiving refresh messages. The interface provides a method that is called in order for an object to be registered for notification events.

A "rendering platform" interface 220 is provided and provides a callback that can be used by the objects that implement the "rendering application interface" discussed below. There is one instance of this object per thread which persists from startup to shutdown. This interface contains a method called "create objects." The "create objects" method can be accessed when no context is available (such as at startup) and is used by the application to preinstantiate rendering support components (RSOs) during initialization.

A "rendering context" interface 222 is provided and provides access to the platform-provided rendering support components or objects, e.g. the request, response, and server discussed above.

Application Objects and Interfaces

Application interfaces are exposed by each application 30 in order to provide the content specific portion 224 of a web site. The descriptions given below constitute but one way of implementing the interfaces and are not intended to be limiting in any way.

A "rendering application" interface 226 is used by the platform and allows the application to control the page rendering process. It is initialized on startup, called for each request, and un-initialized on shutdown. There is one instance of this object per rendering thread, and that instance persists from startup to shutdown.

The rendering application interface 226 includes the following methods set forth in Table 1:

| Name | Description |
| --- | --- |
| InitInstance | Called by the platform to initialize the object at startup time. Gives the object a chance to do any per-thread initialization it needs to. |
| GetPaneCacheID | Called by the platform to "warm up" the pane renderer cache and preinstantiate the pane renderers. Application should fill in the IDs of the pane renderers that will be used in rendering the pages. |
| ExitInstance | Called by the platform to notify the object that the thread is shutting down. Object can release any interfaces it has been using (such as the HTML page layout engine) and deallocate memory. |
| InitializePage | Called per request. Requires application to fill out a page layout structure (example given below). |
| OnInitPassComplete | Called on a per request basis. Notifies application that all appropriate panes have been instantiated by having "Init" functions called. Allows application to prepare for a rendering pass by retrieving necessary data. |
| OnRenderPassComplete | Called on a per request basis. Notifies application that all of the panes have had "Render" functions called. Allows application to free up resources and to write to the end of buffer. |
| EndPage | Called on a per request basis when data has been "flushed" to the client. Application cannot now write to any buffers. Application can free up memory allocated for the page layout. |

An "application attributes" interface 228 provides access to specific attributes of an application that plug into the platform. This interface includes the following methods in Table 2:

| Name | Description |
| --- | --- |
| InitInstance | Called once by the platform on startup before making any other calls. Gives application a chance to initialize data, e.g. read all of application registry keys into memory. Application can register any notification targets. |
| ExitInstance | Called once by the platform on shutdown. Platform guarantees this will be the last call into this interface before shut down. Gives the application a chance to free any memory or objects it has been using since startup. |
| Refresh | Called when the platform is asked to refresh. Application can refresh any caches that it wishes to be up to date, e.g. updating page layout manager and set of properties available by re-calling the GetPropertySpecificationsObject described below. |
| Get Property SpecificationsObject | Returns a collection object containing specifications for all the properties exposed by this application. Includes details on the property's name, ID, and attributes. |

Component Objects and Interfaces

Component interfaces are defined for use by the application. The examples given below constitute but one exemplary implementation and are not intended to be limiting in any way.

A "pane renderer" object 32 performs the actual rendering of a pane. It is initialized with the platform-provided rendering support objects (response, request, server) and is asked to perform the rendering via the "Render" method discussed below. This object includes the following methods in Table 3:

| Name | Description |
| --- | --- |
| InitInstance | Called by platform on startup. |
| ExitInstance | Called by platform on shut down. |
| Init | Called by platform to initialize object with current request. The "rendering context" object (above) provides access to all the platform-provided rendering support objects, e.g. request, response, and server. Pane renderers can add any "shared properties" to property sets during "Init". By setting properties at "Init" time, pane renderers are guaranteed that this information will be available to any other panes that might need it for rendering regardless of what order the pane renderers are called. Similarly, pane renderers may communicate with RSOs at "Init" time to give advanced warning of services they will require. This can facilitate smart batching/pooling of requests by the RSOs. |
| Exit | Called by platform when rendering is finished. Can also be called if error or redirection occurs in the middle of rendering. Pane renderer is guaranteed that if its "Init" method is called and "Init" succeeds, then "Exit" will be called. Pane renderer is not guaranteed that its "Render" method will be called, as an error in another pane may have occurred before this pane got a chance to "Render". All cleanup should occur in "Exit," and not in "Render. |
| Render | Called by platform to generate HTML or any raw output data (such as XML) necessary for the pane. Pane renderer need not perform cleanup, such as releasing any interfaces it is holding, or deallocate memory it has used in this method. It may defer that until its "Exit" method is called. |
| Render error | Called by platform if the "Init" or "Render" methods fail. The failure HRESULT is passed back to the "render error" method to display a descriptive message can be displayed. The pane renderer uses this method to provide an error message (e.g., "Sorry, weather information is not currently available"). |

A "notification target" interface is called by the platform on any notification targets when they receive an event for which they have a registered interest.

A "rendering support" interface provides a quick method of initializing the object with the current rendering context. The methods provided by this interface include the ones set forth in Table 4 below:

| Name | Description |
| --- | --- |
| OnStartPage | Called by platform to initialize for current request. Access is provided to all platform-provided rendering support objects, e.g. request, response, and server. Method is called multiple times on the same object instance, rather than releasing and recreating new instances of the object for each request. |
| OnInitPassComplete | Called per request and notifies RSOs that appropriate panes have been prepared by having "init" functions called. Allows RSOs to prepare for rendering pass by fetching any necessary data, or emitting any shared output fragments such as scripts and styles.. |
| OnRenderPassComplete | Notifies RSOs that all of the panes have had their "Render" functions called. Allows RSOs to free up resources and to write to the end of the buffer. |
| OnEndPage | Called by the platform to notify object that request is finished. Object should release any interfaces it has been using, and deallocate memory. Method will be called multiple times on the same object instance, rather than releasing and recreating new instances of the object for each request.Notifies RSOs that all of the panes have had their "Render" functions called. Allows RSOs to free up resources and to write to the end of the buffer. |

The RSOs 34 also have the "InitInstance", "ExitInstance", "OnStartPage", and "OnEndPage" methods. "InitInstance" and "ExitInstance" are called by the platform on startup and shutdown respectively. "OnStartPage" is called by the platform when a new page is to be rendered, and is called before the pane renderers are initialized. This gives the RSOs a chance to do any per-page setup. "OnEndPage" is called by the platform when the rendering is complete, i.e. after the pane renderers have had their "Exit" notification, but before the application's "EndPage" notification.

In addition to the above-described objects and interfaces, a "browser capabilities" RSO is provided. This component can be instantiated, like any RSO, and is used by the pane renderers. The pane renderers use this object to get information about a particular client such as the HTML that is supported by the browser that generated the request. The browser capabilities object can encapsulate a file in which any number of property definitions for browsers can be declared. Default values can also be set in the event a user's browser is not among those in the listed definitions. For each browser definition, the following is provided: an HTTP User Agent header, and the properties and values associated with that header. Examples of properties associated a browser definition are: (1) whether the browser supports ActiveX controls; (2) whether the browser supports background sounds; (3) whether the browser supports Channel Definition Format for webcasting; (4) whether the browser supports frames, cookies and the like.

Figure 6:
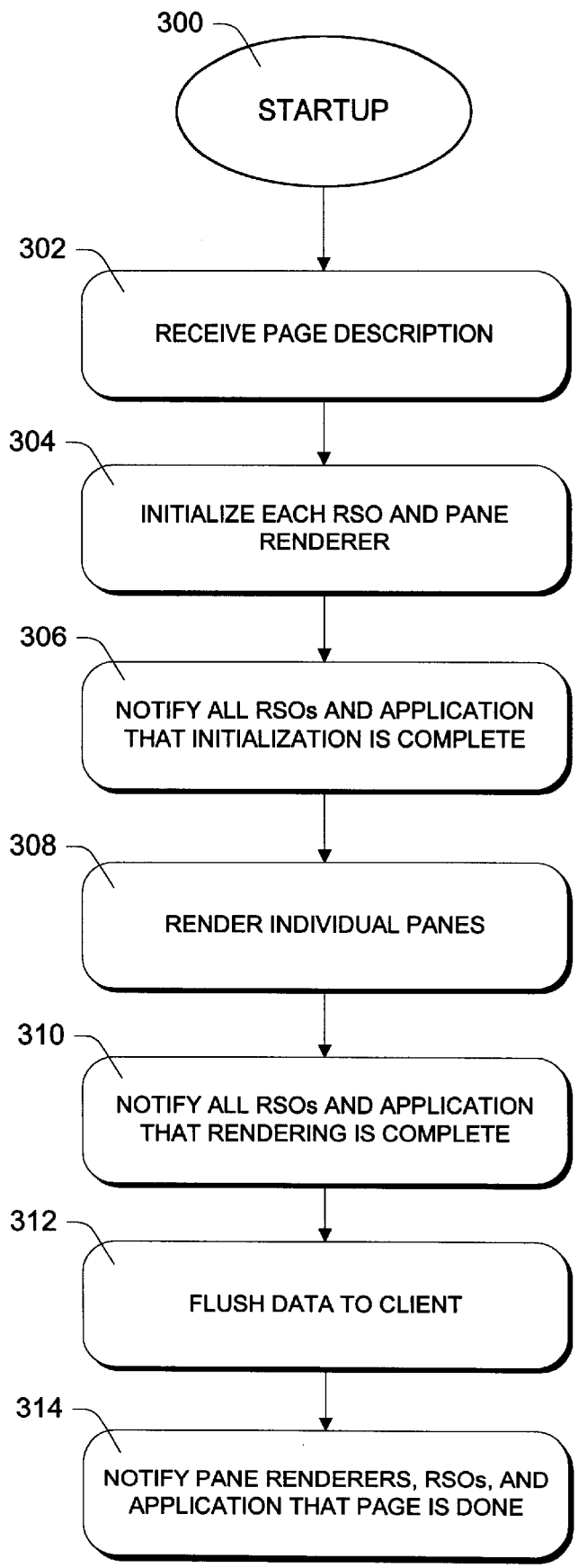
FIG. 6 is a flow diagram showing a process for rendering an information page.
Figure 7:
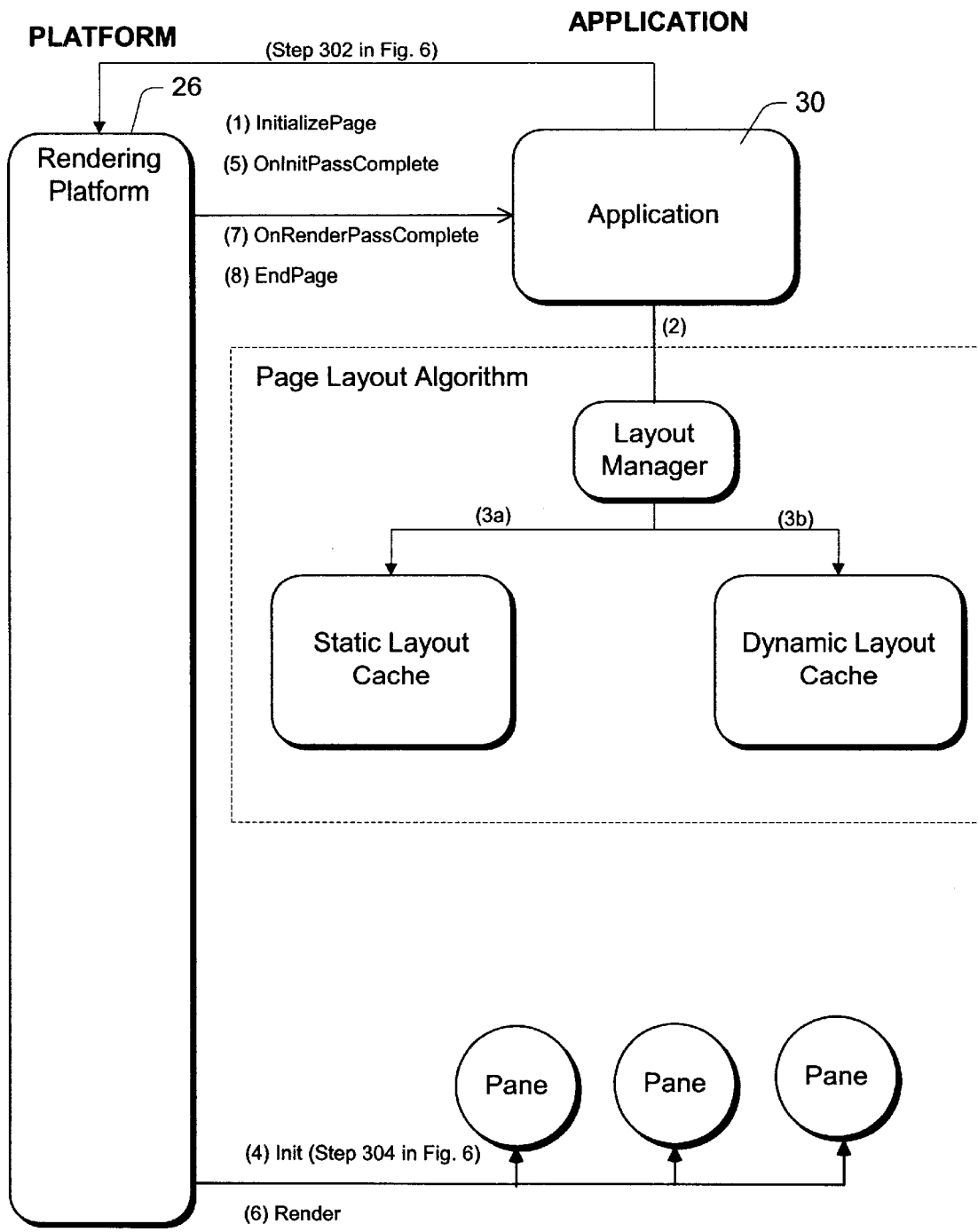
FIG. 7 is a control flow diagram illustrating process flow among software components according to the rendering process of FIG. 6.

FIGS. 6 and 7 show different aspects of the processing that takes place in order to render an information page. FIG. 6 is a flow diagram that describes processing largely from the platform's point of view, while FIG. 7 shows a control flow from both the platform's and the application's point of view. FIG. 7 shows eight specific flows that are numbered "(1)" through "(8)." These specific flows take place in numerical order and correspond to methods that were described above. The process described just below can take place on each of the threads. Additionally, the RSOs are not specifically shown in FIG. 7 for clarity. The RSOs do, however, receive the same notifications as the application as will become apparent below.

At 300, a start up phase is initiated. In this example, threads 218–222 have been already created. Alternately, the threads may need to be created before the start up phase is initiated. Regardless, during start up, platform 26 reads sets of properties and their attributes for each application 30. At this time, the application can register any objects that need to respond to events that could be sent to the platform, e.g. cache refreshes, etc. The platform then reads the set of application-provided rendering support components 34, and instantiates them, one set per thread. The rendering support components 34 are placed in the RSO cache (FIG. 4) specifically provided by each thread. At this point, a pane cache for holding a plurality of pane renderers is created for each thread.

During startup, application 30 tells platform 26 which pane renderers will be needed for a particular page. Platform 26 can either create these pane renderers in advance, or when they are specifically needed. For each thread, the pane renderers are kept in their associated pane cache. At this point in the initialization process, caches for the rendering support components and pane renderers have been created and, if desired, populated. The page renderer service is now waiting to render an information page that comes in from a client in the form of a request.

At 302, a page description or specification is received. In the described embodiment, the platform 26 calls an "InitializePage" method (Flow (1) in FIG. 7). From there, the application can (Flow (2)), but need not, consult a layout manager that, in turn can build the layout by consulting either a static layout cache (Flow 3a) or a dynamic layout cache (Flow 3b). This step is, however, optional in that any suitable page layout algorithm, such as a custom layout algorithm, can be consulted. Responsive to this call, the application returns the page description or page layout description. The page description can contain details on the attributes of a page (e.g. UnvisitedLinkColorNumber), details on the attributes of the panes, and details on which panes are in a page. An exemplary page layout structure is shown just below:

```
struct SPageLayout
{
UINT     uiVersion;   //for version checking
SPane    *aPanes;     //array of panes
UINT     cPanes;      //number of panes
LONG     reserved;    //for future use
}
#define PL_PANE_WRITE      0x01
#define PL_PANE_READ       0x02
struct SPanes
{
DWORD    dwFlags;     //read/write properties, etc
LPWSTR   pwszProgID;  //pane renderer ProgID (name of the pane)
ISWPne-  pPane-       //must be null; will be filled in by the platform.
Render-  Renderer;
er*
```

-continued

```
VOID *    pPaneData;   //data to pass to the PaneRenderer::Render()
LPCSTR    pcszPre;     //string to emit before calling the pane
LPCSTR    pcszPost;    //string to emit after calling the pane.
```

The above structure constitutes a very simple structure that includes an array of panes and the number of panes that comprise the page layout structure. This layout structure is sufficiently generic that it could easily be used to create page descriptions for all manner of client devices and viewers, including for instance HTML, XML, CDF, and PostScript. Other structures can, of course, be used.

After receiving the page description or specification, the platform calls "OnStartPage" to initialize each RSO in the RSO cache for this thread, then passes control to the page renderer service 28 of the platform 26 which initializes each of the pane renderers at 304 by calling an "Init" method (Flow (4) in FIG. 7). During initialization, each pane renderer is initialized with the current request. In this example, each pane renderer is given access to all of the platform-provided rendering support components, e.g. request 204, response 206, and server 208—the so-called "context". The pane renderers can also add any "shared properties" that are provided by the application-provided rendering support components.

After the pane renderers have been initialized at 304, all of the rendering support objects (RSOs) 34, as well as application 30, are notified that initialization is complete at 306 (Flow (5) in FIG. 7). Notification is generated by the platform and sent to the rendering support objects and the application. Notification can be accomplished by making an appropriate call to the callees.

After the initializations and notifications have been accomplished, the individual panes are rendered at 308 by the platform calling the "Render" method of the pane renderers (Flow (6) in FIG. 7). This enables the appropriate panes to be rendered. In this example, a pane is rendered when the corresponding HTML is generated and written to an output buffer managed by the platform.

After all of the panes have been rendered, all of the rendering support components 34, as well as application 30, are notified by the platform 26 that the rendering is complete at 310 (Flow (7) in FIG. 7). Here, the platform calls "OnRenderPassComplete." This can allow the application to free up any resources and to write to the end of the buffer.

After all of the notifications have taken place, the data is flushed to the client at 312. The platform then generates a notification for the pane renderers 32, the RSOs 34, and the application at 314, and notifies them that the page has been rendered. At this point, it is not possible for the application to write to any buffers. In addition, the application can free up the memory it allocated for the page layout. Finally, the "Exit" method of each pane is called, followed by the "EndPage" method of each RSO and the application.

Advantages of the above-described embodiments include those that stem from the fact that the various systems keep state. Accordingly, benefits such as access to shared resources such as caches, connections, and the like can be exploited. Moreover, work for rendering an information page is readily partitionable and reusable. In addition, use of the above-described systems are not inextricably connected to any one particular programming language. The various described systems and methods are extensible to enable piece-wise generation of HTML pages for high performance, large-scale web sites. Advantages are achieved by dividing a page into panes which are rendered by individual pane renderer services of the platform. The pane renderers can be shared between pages having different combinations of panes, or even re-used across multiple applications. Additionally, rendering support components or objects are provided which provide access to shared services or data (e.g. ads, user preferences, client-side scripts, and stylesheets) that might be required by multiple panes on a page. Pages are created dynamically by the application, in a prescribed fashion. A platform then processes the page and causes the appropriate page renderers and rendering support components to be called, initialized and used by the pane renderers.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. An information server system for rendering information pages comprising:

a page renderer service configured to render different information pages, wherein at least two of the information pages are renderable to have different combinations of panes;

a plurality of pane renderers operably associated with the page renderer service for rendering individual panes within an information page, the pane renderers being adapted for use across multiple information pages;

a platform comprising code for handling requests for the information pages, and wherein the page renderer service comprises part of the platform; and an application communicatively associated with the page renderer service, the application containing content-specific portions for at least one of the information pages, the application further being configured to provide a page layout description to the page renderer service which describes all of the panes which are needed to render the one information page.

2. An information server system for rendering information pages comprising:

a page renderer service configured to render different information pages, wherein at least two of the information pages are renderable to have different combinations of panes:

a plurality of pane renderers operably associated with the page renderer service for rendering individual panes within an information page, the pane renderers being adapted for use across multiple information pages;

a platform comprising code for handling requests for the information pages, and wherein the page renderer service comprises part of the platform;

an application communicatively associated with the page renderer service, the application containing content-specific portions for at least one of the information pages, the application further being configured to provide a page layout description to the page renderer service which describes all of the panes which are needed to render the one information page; and a plurality of rendering support components in selective communication with the plurality of pane renderers, the rendering support components being configured to provide common data or services which might be needed by more than one pane renderer to the respective pane renderers that need the common data or services.

3. An information server system for rendering information pages comprising:
   a page renderer service configured to render information pages;
   a plurality of pane renderers operably associated with the page renderer service for rendering individual different panes within an information page; and
   at least one rendering support component in selective communication with a plurality of the pane renderers for providing common data or services to the plurality of pane renderers.

4. A system as recited in claim 3, wherein said at least one rendering support component comprises a plurality of rendering support components.

5. A system as recited in claim 3, wherein said at least one rendering support component is a COM object.

6. A system as recited in claim 3, wherein the pane renderers are separate COM objects.

7. A system as recited in claim 3, wherein said at least one rendering support component and said pane renderers are COM objects.

8. A system as recited in claim 3 further comprising a platform comprising code for handling requests for information pages, and wherein the page renderer service comprises a portion of the platform.

9. A system as recited in claim 3 further comprising an application which contains content-specific portions for an information page, and wherein said at least one rendering support component is provided by the application.

10. A system as recited in claim 3 further comprising:
    a platform comprising code for handling requests for information pages, and wherein the page renderer service comprises a portion of the platform; and
    an application which contains content-specific portions for an information page, and wherein said at least one rendering support component is provided by the application.

11. A system as recited in claim 10, wherein said at least one rendering support component and said pane renderers are COM objects.

12. A computerized system for rendering information pages comprising:
    a platform comprising code for handling requests for an information page; and
    an application communicatively associated with the platform and containing content-specific portions for the information page;
    a page renderer service communicatively associated with the platform and the application, and configured to render an information page;
    a plurality of pane renderer objects selectively callable by the page renderer service for rendering individual panes within an information page; and
    at least one rendering support object in selective communication with a plurality of the pane renderer objects for providing common data or services to the plurality of pane render objects.

13. A system as recited in claim 12, wherein the page renderer service comprises part of the platform.

14. A system as recited in claim 12, wherein the pane renderer objects are COM objects.

15. A system as recited in claim 12, wherein said at least one rendering support object comprises a plurality of rendering support objects.

16. A system as recited in claim 12, wherein the platform is comprises a thread pool comprising multiple threads each of which is capable of rendering an information page.

17. A system as recited in claim 16, wherein individual threads of the thread pool each comprise:
    a page renderer service; and
    a plurality of pane renderer objects.

18. A system as recited in claim 17, wherein at least one of the threads of the thread pool comprises at least one rendering support object.

19. A system as recited in claim 17, wherein at least one of the threads of the thread pool comprises a plurality of rendering support objects.

20. A system as recited in claim 17, wherein each of the threads of the thread pool comprises at least one rendering support object.

21. A system as recited in claim 17, wherein each of the threads of the thread pool comprises a plurality of rendering support objects.

22. In an information server system, a method of rendering information pages comprising:
    rendering at least a portion of an information page with a plurality of pane renderers, individual pane renderers rendering individual respective panes of the information page, wherein said rendering of at least a portion of the-information page comprises calling a rendering interface of each of the pane renderers so that the pane renderers can render their panes; and
    sharing said at least one pane renderer in a manner which permits at least a portion of another information page having a different combination of panes to be rendered.

23. The method of claim 22 further comprising prior to said rendering of at least a portion of the information page:
    receiving a page layout description which contains a description of all panes which constitute one of the information pages; and
    initializing said at least one pane renderer responsive to receiving the page layout description.

24. The method of claim 22, wherein said sharing of said at least one pane renderer comprises sharing a plurality of pane renderers in a manner which permits at least a portion of another information page to the rendered.

25. The method of claim 22 further comprising prior to said rendering of at least a portion of the information page, calling each pane renderer so the pane renderer can render its pane.

26. The method of claim 22 further comprising prior to said rendering of at least a portion of the information page, implementing the pane renderers as COM objects.

27. An information server system for rendering information pages comprising:
    a page renderer service configured to render different information pages, wherein at least two of the information pages are renderable to have different combinations of panes;
    a plurality of pane renderers operably associated with the page renderer service for rendering individual panes within an information page, the pane renderers being adapted for use across multiple information pages; and
    a platform comprising code for handling requests for the information pages, and wherein the page renderer service comprises part of the platform.

28. A system as recited in claim 27 further comprising an application communicatively associated with the platform, the application containing content-specific portions for at least one of the information pages, the application further being configured to communicate the content-specific portions for the one information page to the platform.

29. A system as recited in claim 27, wherein the pane renderers are adapted for use across multiple applications.

30. A system as recited in claim 27, wherein the pane renderers are reusable.

31. A system as recited in claim 27, wherein each pane renderer is a COM object.

32. A system as recited in claim 27 further comprising an application communicatively associated with the page renderer, the application containing content-specific portions for at least one of the information pages, the application further being configured to provide a page layout description to the page renderer service which describes all of the panes which are needed to render the one information page.

33. A system as recited in claim 27 further comprising a plurality of rendering support components in selective communication with the plurality of pane renderers, the rendering support components being configured to provide common data or services which can be used by more than one pane renderer to the respective pane renderers that need the common data or services.

34. A system as recited in claim 33 further comprising an application communicatively associated with the page renderer service, the application containing content-specific portions for at least one of the information pages, the application further being configured to provide a page layout description to the page renderer service which describes all of the panes which are needed to render the one information page, wherein the rendering support components are implemented by the application.

35. An information server system for rendering information pages comprising:

a page renderer service configured to render different information pages, wherein at least two of the information pages are renderable to have different combinations of panes;

a plurality of pane renderers operably associated with the page renderer service for rendering individual panes within an information page, the pane renderers being adapted for use across multiple information pages; and a plurality of rendering support components in selective communication with the plurality of pane renderers, the rendering support components being configured to provide common data or services which might be needed by more than one pane renderer to the respective pane renderers that need the common data or services.

36. A system as recited in claim 35 further comprising an application communicatively associated with the page renderer service, the application containing content-specific portions for at least one of the information pages, the application further being configured to provide a page layout description to the page renderer service which describes all of the panes which are needed to render the one information page, wherein the rendering support components are implemented by the application.

37. A system as recited in claim 35, wherein the pane renderers are adapted for use across multiple applications.

38. A system as recited in claim 35, wherein the pane renderers are reusable.

39. A system as recited in claim 35, wherein each pane renderer is a COM object.

40. A system as recited in claim 35 further comprising:

a platform comprising code for handling requests for the information pages, and wherein the page renderer service comprises part of the platform; and an application communicatively associated with the platform, the application containing content-specific portions for at least one of the information pages, the application further being configured to communicate the content-specific portions for the one information page to the platform.

41. A system as recited in claim 35 further comprising an application communicatively associated with the page renderer, the application containing content-specific portions for at least one of the information pages, the application further being configured to provide a page layout description to the page renderer service which describes all of the panes which are needed to render the one information page.

42. An information server system for rendering information pages comprising:

a page renderer service configured to render information pages;

a plurality of pane renderers operably associated with the page renderer service for rendering individual different panes within an information page;

a plurality of rendering support components in selective communication with a plurality of the pane renderers for providing common data or services which can be used by more than one pane renderer to the respective pane renders that need the common data or services; and a platform comprising code for handling requests for information pages, and wherein the page renderer service comprises a portion of the platform.

43. A system as recited in claim 42, wherein said at least one rendering support component is a COM object.

44. A system as recited in claim 42, wherein the pane renderers are separate COM objects.

45. A system as recited in claim 42, wherein said at least one rendering support component and said pane renderers are COM objects.

46. A system as recited in claim 42 further comprising an application which contains content-specific portions for an information page, and wherein said at least one rendering support component is provided by the application.

47. In an information server system, a method of rendering information pages comprising:

creating a page renderer service in a platform, wherein the platform comprises code for handling requests for information pages;

receiving a page description which describes a plurality of panes which are needed to render an information page;

calling individual interfaces of a plurality of pane renderers which are implemented as COM objects to render individual different panes within the information page; and wherein said receiving the page description comprises receiving the page description with the page renderer service.

48. The method of claim 47, wherein said receiving of the page description comprises receiving a page description from an application which contains content-specific portions for an information page.

49. The method of claim 48 further comprising prior to receiving the page description from the application, calling the application so that the application will know to return the page description.

50. The method of claim 47 further comprising generating a notification after the panes are rendered by the pane renderers.

51. The method of claim 47 further comprising generating a notification after processing of an information page is complete.

52. The method of claim 47 further comprising:

generating a notification after the panes are rendered by the pane renderers; and generating a notification after processing of an information page is complete.

53. A system as recited in claim 27, wherein the platform comprises code for creating a thread pool comprising multiple threads, each thread being capable of processing a request for an information page into an information page; and for each thread:
  providing a page renderer service which is configured to render information pages;
  instantiating one or more pane renderer objects for rendering one or more panes within an information page;
  instantiating one or more rendering support components for providing data or services which are needed by more than one pane renderer to render a pane.

54. The method of claim 47 further comprising:

creating a thread pool comprising multiple threads, each thread being capable of processing a request for an information page into an information page; and establishing a cache, for at least one of the threads, in which a plurality of pane renderers can be placed.

* * * * *